United States Patent Office 2,880,209
Patented Mar. 31, 1959

2,880,209

PIPERAZINE QUATERNARY SALTS HAVING PARASITICAL ACTIVITY AND METHOD OF MAKING

Morton Harfenist, Yonkers, N.Y.

No Drawing. Application September 2, 1954
Serial No. 453,970

12 Claims. (Cl. 260—268)

This invention relates to a novel class of piperazine quaternary salts having parasitical action and the method of preparing such derivatives. The members of this family have marked activity against certain nematode endoparasites such as ascaris and pinworms.

The compounds of this invention can be represented by Formula I

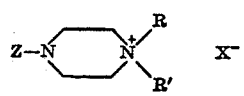

wherein R and R' are hydrocarbon radicals having between them 8 to 20 carbon atoms, X⁻ is the anion of a therapeutically acceptable non-toxic acid and Z is selected from the class consisting of the carbalkoxy, benzoyl and dialkylcarbamyl radicals and hydrogen.

The preparation of these compounds follows lines in general worked out in the piperazine field and is illustrated in a general fashion in the following chart, specific illustrations being given in the examples.

The last line of synthesis, through the nitroso derivatives, is especially useful when one of the radicals R and R' is a benzyl group. In such cases, acid hydrolysis for the removal of a carbethoxyl radical tends also to hydrolyze the benzyl group. In the given route the protective nitroso function is removed selectively and benzyl radicals are not readily affected.

CHART

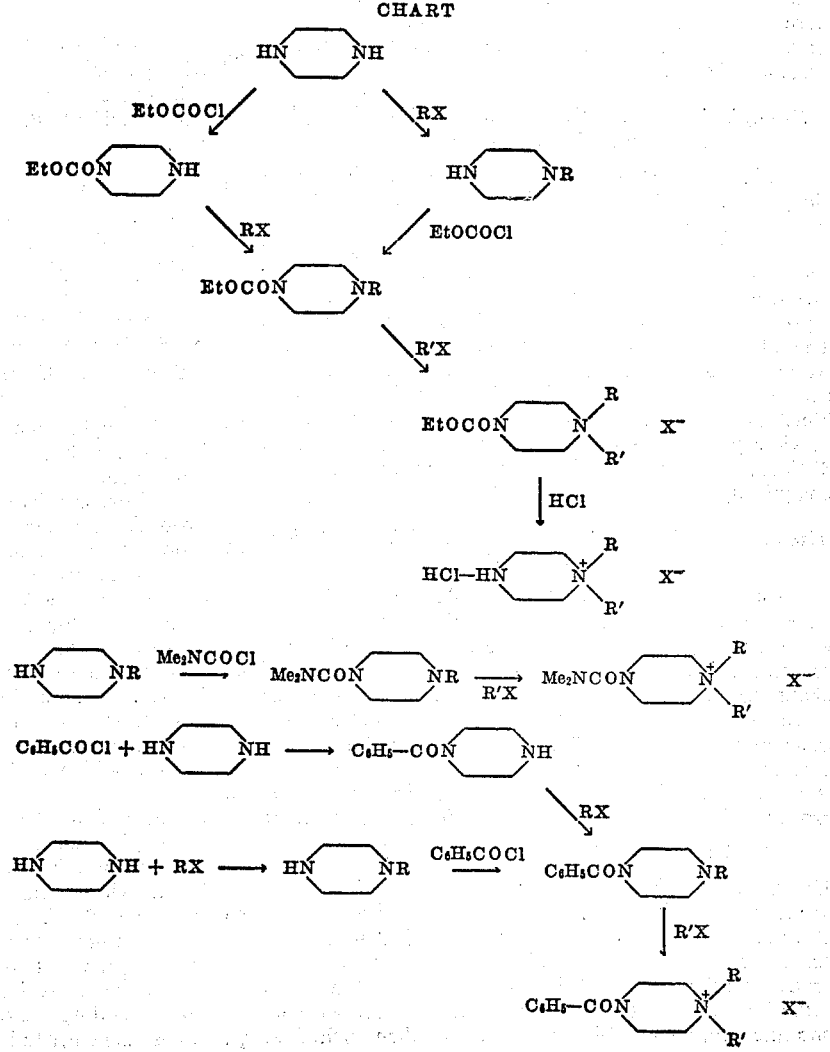

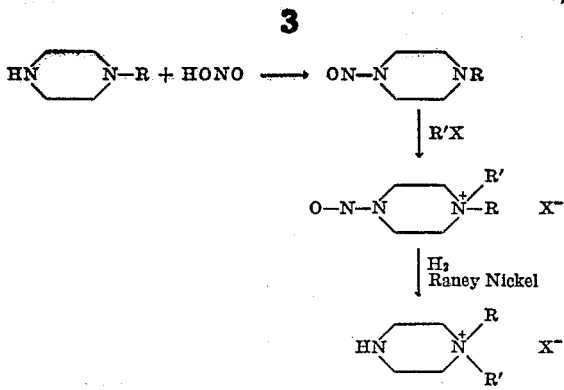

Example 1.—N-carbethoxy-N'-methyl-N'-n-nonylpiperazine

A solution of 8.8 g. (0.27 mole) of N-carbethoxy-N'-monylpiperazine hydrochloride (ref.: M. Harfenist, J. Am. Chem. Soc., in press) in 100 ml. of water was treated with excess cold aqueous sodium hydroxide, and the resulting base was extracted into ether. The ethereal extract was concentrated on a steam bath, poured into a pressure-resistant bottle, and treated with a solution of 14 g. (0.1 mole) of methyl iodide in 10 ml. of anhydrous ethanol. The sealed bottle was kept at about 40° for five days, then opened, and its contents crystallized by adding about 40 ml. of absolute ethanol, an equal volume of ethyl acetate and then anhydrous ether to incipient turbidity. After allowing the crystallizing solution to stand for 3 weeks to ensure completeness of crystallization, 10 g. of yellowish-white crystals were obtained, which were recrystallized from ethyl acetate (about 300 ml.) containing about 10 ml. of absolute ethanol.

Example 2.—N-carbethoxy-N'-methyl-N'-n-dodecylpiperazinium bromide

A mixture of 51 g. of N-carbethoxy-N'-methylpiperazine, 100 g. of n-dodecyl bromide, and 400 ml. of absolute ethanol was refluxed for 24 hours. Most of the ethanol was then distilled off, and 300 ml. of hot ethyl acetate was added, followed by the addition of absolute ether to incipient turbidity. The solution was seeded with a few crystals of the product, and let stand for three days. The solid was removed by filtration and the mother liquors warmed and treated with more absolute ether to give two more crops of white solid. All the solids were combined and recrystallized from boiling dioxane, which had previously been refluxed with sodium metal and then distilled. This recrystallized product, when dried, was analytically pure.

Example 3.—N-benzyl-N-methylpiperazinium chloride hydrochloride

A solution of 12.5 g. of N-nitroso-N'-benzyl-N'-methylpiperazinium chloride in about 50 ml. of pure methanol was reduced at room temperature by hydrogen initially at three atmospheres over-pressure in the presence of about 2.5 g. of Raney nickel catalyst. Hydrogen was taken up by the reaction at a rate of about 0.005–0.002 mole/minute for about 3 hours, and then the uptake, measured in the usual way, slowed markedly and nearly stopped after a bit over the theoretical amount of hydrogen had been absorbed, corresponding to the reaction:

$$R_2N-NO + 3H_2 \rightarrow R_2NH + NH_3 + H_2O$$

The reduction mixture was vented in the usual way, filtered, treated with slightly over the theoretical amount of solid dimethylglyoxine to remove divalent nickel dissolved from the catalyst, refiltered and evaporated to dryness on the steam bath in vacuo. The resulting solid could be recrystallized from anhydrous ethanol-benzene-absolute ether with fair recovery, and then melted at 167–169°, but was best converted, by passing a slight excess of dry hydrogen chloride into its ethanolic solution, into its hydrochloride. This could be recrystallized from the same solvent mixture and melted at 116°, but changed on remaining overnight to a form melting at 172–175°. This gave the expected analysis for chloride ion.

Example 4.—N-carbethoxy-N'-allyl-N'-(α-carbethoxyethyl)piperazinium bromide

A mixture of 19 g. of N-(α-carbethoxyethyl)-N'-carbethoxypiperazine, 15 g. of allyl bromide, 20 ml. of acetone, and a few drops of benzene was allowed to remain in a stoppered flask for two months. The oil which at first was deposited from solution crystallized and was recrystallized for analysis.

Example 5.—N-methyl-N-n-tridecylpiperazinium chloride hydrochloride

A solution of 34 g. of N-carbethoxy-N'-methyl-N'-n-tridecylpiperazinium bromide was converted to its chloride by the use of dry freshly-prepared methanolic hydrochloric acid [A. P. Phillips and R. Baltzly, J. Am. Chem. Soc. 74, 5231 (1952)] and that chloride heated under reflux for four days with 320 ml. of constant-boiling aqueous hydrochloric acid. The solvent was then removed by vacuum distillation on the steam bath, and the remaining oil crystallized and recrystallized from absolute ethanol-acetone. The crystalline solids' apparent (capillary) melting point varied with the rate of heating, but usually seemed to be about 116–120°, although different observers reported melting points from 109 to 143°.

Example 6.—N-benzoyl-N'-methyl-N'-n-dodecylpiperazinium bromide

N-benzoyl-N'-methylpiperazine was prepared by treating 50 g. of N-methylpiperazine dissolved in 100 ml. of water with 84 g. of benzoyl chloride in small portions with vigorous agitation, dropping in 10% aqueous sodium hydroxide solution at a rate sufficient to maintain the reaction mixture about pH 8–10, and adding cracked ice to keep the mixture cold. When the benzoyl chloride was entirely consumed, the cold solution (ca. 500 ml.) was treated with 300 g. of sodium hydroxide pellets with continuous stirring and cooling, and then diluted to barely dissolve the solid, presumably sodium benzoate, which formed. The solution was extracted twice with an ether-benzene mixture, the organic solvent layer dried over anhydrous potassium carbonate, filtered, and distilled. The portion boiling at 114–122° at a gauge reading of 0.04 mm. was 75 g., whose neutral equivalent corresponded within 1% to the calculated value for N-benzoyl-N'-methylpiperazine.

To prepare the quaternary bromide, 10 g. of N-benzoyl-N'-methylpiperazine was mixed with 20 g. of lauryl bromide and 20 ml. of acetone, and allowed to remain in a stoppered flask at room temperature for 25 days. The resulting syrup was stirred with 100 ml. of absolute ether, whereupon it precipitated. The solid was recrystallized from a boiling acetone-benzene mixture by the addition of absolute ether to incipient turbidity.

*Example 7.—N-dimethylcarbamyl-N'-methyl-N'-benzyl-piperazinium chloride*

Fifty grams of dimethylcarbamyl chloride dissolved in 100 ml. of absolute ether was added to 93 g. of N-methylpiperazine dissolved in a like amount of absolute ether during about ½ hour. The mixture was stirred for an additional 2½ hours, and filtered to remove the ether-insoluble salts. The filtrate was concentrated on the steam bath and finally vacuum distilled, collecting 68.5 g. of N-dimethylcarbamyl - N' - methylpiperazine boiling 134–141°/21 mm. Eleven grams of this, 10 g. of benzyl chloride and 30 ml. of acetone were left at room temperature in a stoppered flask for 12 days, and then diluted with a large volume of ethyl acetate. The resulting solid was removed by filtration. It was recrystallized by dissolving it in about 5 parts of absolute ethanol, and then adding first about 80 parts of dry acetone, and finally, after warming the solution, absolute ether to incipient turbidity.

thermic rapid reaction, and then allowed to remain in a stoppered flask for 3 days. Beautiful slightly tan platelets crystallized from the solution. The reaction mixture was diluted with absolute ether and filtered. The solid was hydroscopic when solvent-wet, and so it was dried in a vacuum desiccator. It was best recrystallized from an acetone-benzene mixture.

By means of the methods of the above examples, the compounds shown in the following table were also prepared.

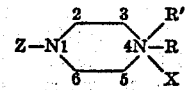

| Z | R | R' | X | M. P., degrees | Recryst. Solvent (a) |
|---|---|---|---|---|---|
| EtOOC— | CH₃— | n—C₇H₁₅ | Br | 161–162 | A-EA-E |
| EtOOC— | CH₃— | n—C₈H₁₇ | Br | 183–184 | A-EA-E |
| EtOOC— | CH₃— | n—C₉H₁₉ | I | 107–108.5 | A-EA |
| EtOOC— | CH₃— | n—C₁₀H₂₁ | Br | 203.5–204.5 | Ac-EA |
| EtOOC— | CH₃— | n—C₁₁H₂₃ | Br | 198.5–199 | Ac-EA |
| EtOOC— | CH₃— | n—C₁₂H₂₅ | Br | 216 | D |
| EtOOC— | CH₃— | n—C₁₃H₂₇ | Br | 215.5–218.5 | D |
| EtOOC— | CH₃— | n—C₁₄H₂₉ | Br | 203–203.5 | A-EA-E |
| EtOOC— | CH₃— | n—C₁₅H₃₁ | Br | 201–202.5 | Ac-EA/N-EA |
| EtOOC— | CH₃— | n—C₁₆H₃₃ | Br | 219–221 | B-EA |
| EtOOC— | CH₃— | —C₉H₁₈CH=CH₂ | I | 111–113 | EA |
| EtOOC— | CH₃— | —CH₂C≡C—C₄H₉ | Br | 123–125 | Ac-B-E |
| EtOOC— | CH₃— | —CH₂C₆H₅ | Cl | 185.5–186.5 | A-EA-E |
| EtOOC— | CH₃— | —CH₂C₆H₄Cl(4) | Cl | 189.2 | A-Ac-E |
| EtOOC— | CH₃— | —CH₂C₆H₃Cl₂(2,4) | Cl | 178.3–179 | A-B-E |
| EtOOC— | CH₃— | —CH₂C₆H₄OCH₃(4) | Cl | 188.8 | N-EA |
| EtOOC— | CH₃— | —CH₂C₆H₄CH₃(2) | Br | 200.5–202.5 | A-Ac-E |
| EtOOC— | CH₃— | —CH₂CH=CH—C₆H₅ | Cl | 157–158 | Ac-EA-E |
| EtOOC— | CH₃— | —CH₂C(=O)—C₆H₅ | Br | 172.5–175 | N-EA |
| EtOOC— | CH₃— | —CH₂—C(=C(=O))—C(=O)—S (ring) | Br | 138–145 | A-EA |
| EtOOC— | CH₃— | CH₃—C(=C(=O))—C(=O)—S (ring) | Cl | 164–165 | A-EA-E |
| EtOOC— | C₄H₉— | —C₁₀H₂₁ | I | 155.5–156.5 | A-EA |
| EtOOC— | C₂H₅— | C₈H₁₇ | I | 106–109 | Ac-E |
| EtOOC— | C₆H₅CH₂— | —CH₂—C(=C(=O))—C(=O)—S (ring) | Br | 163.5–166.5 | A-B-E |
| EtOOC— | CH₃— | —CH₂C₆H₄CH₃(3) | Br | 176–178 | A-EA-E |
| CH₃OOC— | CH₃— | C₁₂H₂₅ | Br | 192–193 | MA |
| C₆H₅CO— | CH₃— | C₁₂H₂₅ | Br | 174.5–175.3 | Ac-B-E |
| C₆H₅CO— | CH₃— | —CH₂C₄H₅ | Cl | 116–117 | A-AE-E |
| C₆H₅CO— | CH₃— | —CH₂C₆H₅ | Cl | 225–226 | Ac-E |
| CH₃CO— | CH₃— | —C₁₄H₂₉ | Br | 166.5 | Ac-B |
| CH₃CO— | CH₃— | —CH₂C≡CH | Br | 167.5–168.5 | A-EA-E |
| EtOOC— | C₆H₅CH₂— | —CH₂C₆H₅ | Cl | 202.5–203 | A-Ac |
| H₂NCO— | CH₃— | —CH₂C₆H₅ | Cl | 175 | A-Ac |
| (CH₃)₂NCO— | CH₃— | —C₁₂H₂₅ | Br | 187–190 | D |
| (CH₃)₂NCO— | CH₃— | —CH₂C₆H₅ | Cl | 116, 172–175 | A-B-E |
| H(HCl) | C₂H₅ | —C₈H₁₇ | Cl | 188–195 | A-B-E |
| H(HCl) | CH₃— | —C₁₂H₂₅ | Cl | 158–159 | A-Ac |
| H(HCl) | CH₃— | —C₁₃H₂₇ | Cl | 109–120 | A-Ac |
| H(HCl) | CH₃— | —C₁₄H₂₉ | Cl | 144–145 | A-EA-E |
| H(HBr) | CH₃— | —C₁₆H₃₃ | Br | 105–108 | A-EA |
| C₂H₅OOC— | CH₃— | CH₂COOC₁₂H₂₅ | Cl | 113.5–116 | M-B-E |
| C₂H₅OOC— | CH₂=CHCH₂ | —CH(CH₃)COOC₂H₅ | Br | 114.5–116 | A-B-E |
| C₂H₅OOC— | C₆H₅(CH₂—)₂ | —CH₂C₆H₅ | Cl | 181.5–183 | A-EA-E |
| C₂H₅OOC— | C₆H₅(CH₂—)₂ | C₁₂H₂₅ | I | 111–114 | EA-E |

*Example 8.—N-carbethoxy-N'-methyl-N'-(2-heptyn-yl)-piperazinium bromide*

A mixture of 7.5 g. of N-carbethoxy-N'-methylpiperazine, 8 g. of 1-bromo-2-heptyne, and 20 ml. of acetone was cooled at the tap to moderate the initially very exo- Recrystallization solvents:
  A=Absolute ethanol
  AW=95% ethanol
  Ac=Acetone
  B=Benzene
  D=Dioxane (purified)
  E=Absolute ether
  EA=Ethyl acetate
  MA=Methyl acetate
  N=Nitromethane

What is claimed is:

1. A compound represented by the formula

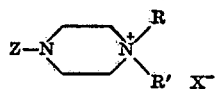

wherein R and R' are radicals selected from the class consisting of the aralkyl radicals of from 7 to 9 carbon atoms and the straight-chain hydrocarbon radicals, R and R' having together from 8 to 20 carbon atoms X— is the anion of a therapeutically acceptable non-toxic acid and Z is a radical selected from the class consisting of the carbalkoxy radicals, the carbamyl radicals, benzoyl radicals and hydrogen.

2. A compound represented by the formula

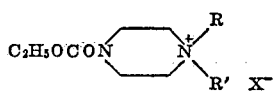

wherein R and R' are radicals selected from the class consisting of the aralkyl radicals of from 7 to 9 carbon atoms and the straight-chain hydrocarbon radicals, R and R' having together from 8 to 20 carbon atoms and X— is the anion of a non-toxic acid.

3. A compound represented by the formula

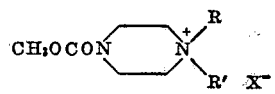

wherein R and R' are radicals selected from the class consisting of the aralkyl radicals of from 7 to 9 carbon atoms and the straight-chain hydrocarbon radicals, R and R' having together from 8 to 20 carbon atoms and X— is the anion of a therapeutically acceptable non-toxic acid.

4. A compound represented by the formula

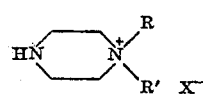

wherein R and R' are radicals selected from the class consisting of the aralkyl radicals of from 7 to 9 carbon atoms and the straight-chain hydrocarbon radicals, R and R' having together from 8 to 20 carbon atoms and X— is the anion of a therapeutically acceptable non-toxic acid.

5. A compound represented by the formula

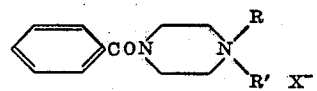

wherein R and R' are radicals selected from the class consisting of the aralkyl radicals of from 7 to 9 carbon atoms and the straight-chain hydrocarbon radicals, R and R' having together from 8 to 20 carbon atoms and X— is the anion of a therapeutically acceptable non-toxic acid.

6. A compound represented by the formula

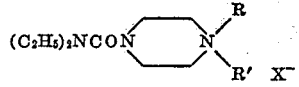

wherein R and R' are radicals selected from the class consisting of the aralkyl radicals of from 7 to 9 carbon atoms and the straight-chain hydrocarbon radicals, R and R' having together from 8 to 20 carbon atoms and X— is the anion of a therapeutically acceptable non-toxic acid.

7. Therapeutically acceptable N-carbethoxy,N'-methyl-N'-tetradecylpiperazinium non-toxic acid salts.

8. Therapeutically acceptable N - laurylpiperazinium non-toxic acid salts.

9. Therapeutically acceptable N'-n-decylpiperazinium non-toxic acid salts.

10. Therapeutically acceptable N'-n-undecylpiperazinium non-toxic acid salts.

11. A method of making compounds having the parasitical activity which comprises forming a quaternary salt of a compound having the formula

with a quaternizing reagent R' X wherein R and R' are radicals selected from the class consisting of the aralkyl radicals of from 7 to 9 carbon atoms and the straight-chain hydrocarbon radicals, R and R' having together from 8 to 20 carbon atoms X— is the anion of a therapeutically acceptable non-toxic acid and Z is a radical selected from the class consisting of the carbalkoxy radicals, the carbamyl radicals, benzoyl radicals and hydrogen.

12. Therapeutically acceptable N-methyl, N-tetradecyl piperazinium nontoxic salts.

References Cited in the file of this patent

Richter: Textbook of Organic Chem., 1938 ed., page 9, John Wiley and Sons, Inc., New York, N. Y.